(12) United States Patent
Kiguchi et al.

(10) Patent No.: US 10,583,404 B2
(45) Date of Patent: Mar. 10, 2020

(54) COMPOSITE HOLLOW FIBER MEMBRANE MODULE AND MANUFACTURING METHOD THEREFOR

(71) Applicant: Asahi Kasei Kabushiki Kaisha, Tokyo (JP)

(72) Inventors: Akira Kiguchi, Tokyo (JP); Tomoya Anan, Tokyo (JP); Mikihiko Nakamura, Tokyo (JP); Toshihiko Ohashi, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 369 days.

(21) Appl. No.: 15/504,859

(22) PCT Filed: Aug. 20, 2015

(86) PCT No.: PCT/JP2015/073434
§ 371 (c)(1),
(2) Date: Feb. 17, 2017

(87) PCT Pub. No.: WO2016/027869
PCT Pub. Date: Feb. 25, 2016

(65) Prior Publication Data
US 2017/0266625 A1    Sep. 21, 2017

(30) Foreign Application Priority Data
Aug. 21, 2014    (JP) .................................. 2014-168776

(51) Int. Cl.
*B01D 69/08*    (2006.01)
*B01D 61/00*    (2006.01)
(Continued)

(52) U.S. Cl.
CPC ........... *B01D 69/08* (2013.01); *B01D 61/002* (2013.01); *B01D 63/02* (2013.01); *B01D 63/021* (2013.01);
(Continued)

(58) Field of Classification Search
None
See application file for complete search history.

(56) References Cited

U.S. PATENT DOCUMENTS 4,664,669 A       5/1987   Ohyabu et al.
6,413,425 B1 *    7/2002   Hachisuka ......... B01D 67/0088
                                                        210/500.38

(Continued)

FOREIGN PATENT DOCUMENTS

CN    101269301 A    9/2008
CN    102773024 A    11/2012
(Continued)

OTHER PUBLICATIONS

Supplementary European Search Report issued in corresponding European Patent Application No. 15833747.7 dated Jul. 6, 2017.
(Continued)

*Primary Examiner* — Ana M Fortuna
(74) *Attorney, Agent, or Firm* — Morgan, Lewis & Bockius LLP

(57) ABSTRACT

The present invention offers a forward osmosis composite hollow fiber membrane module having hollow fiber bundles comprising a plurality of hollow fibers, the hollow fibers having a separation layer composed of a macromolecular polymer thin film provided on the inner surface of a microporous hollow fiber supporting membrane, wherein the membrane area of the hollow fiber bundle is at least 1 m², and a variation coefficient for the average thickness of the separation layer in the radial direction and the lengthwise (Continued)

direction of the hollow fiber bundles, as calculated by a method of measuring the mass of the separation layer portion in a scanning electron microscope image of a cross section of the separation layer in the thickness direction, is 0% to 60%.

10 Claims, 9 Drawing Sheets

(51) Int. Cl.
    *B01D 69/12*     (2006.01)
    *B01D 71/56*     (2006.01)
    *B01D 71/54*     (2006.01)
    *B01D 63/02*     (2006.01)
    *B01D 71/52*     (2006.01)
    *C02F 1/44*     (2006.01)

(52) U.S. Cl.
    CPC ............. *B01D 69/12* (2013.01); *B01D 71/52* (2013.01); *B01D 71/54* (2013.01); *B01D 71/56* (2013.01); *C02F 1/445* (2013.01); *B01D 69/125* (2013.01); *B01D 2323/10* (2013.01); *B01D 2323/30* (2013.01); *B01D 2323/42* (2013.01); *B01D 2325/023* (2013.01); *B01D 2325/04* (2013.01); *B01D 2325/06* (2013.01)

(56) References Cited

U.S. PATENT DOCUMENTS

| | | |
|---|---|---|
| 2008/0197070 A1 | 8/2008 | Sirkar et al. |
| 2013/0037479 A1 | 2/2013 | Hayashi et al. |
| 2014/0008291 A1* | 1/2014 | Tang .................... B01D 61/002 210/499 |
| 2015/0265976 A1 | 9/2015 | Shimizu et al. |
| 2015/0314245 A1 | 11/2015 | Nakao et al. |
| 2016/0355416 A1* | 12/2016 | Koehler .................. C02F 1/441 |
| 2017/0197182 A1* | 7/2017 | Holmberg .......... B01D 67/0095 |

FOREIGN PATENT DOCUMENTS

| | | |
|---|---|---|
| JP | S63-205108 A | 8/1988 |
| JP | H02-006848 A | 1/1990 |
| JP | H02-056224 A | 2/1990 |
| JP | H03-35971 B2 | 5/1991 |
| JP | H08-511991 A | 12/1996 |
| JP | 2013-502323 A | 1/2013 |
| JP | 2013-545593 A | 12/2013 |
| JP | 2014-512951 A | 5/2014 |
| WO | 95/01219 A1 | 1/1995 |
| WO | 2011/028541 A2 | 3/2011 |
| WO | 2012/002263 A1 | 1/2012 |
| WO | 2012/047282 A2 | 4/2012 |
| WO | 2012/112123 A1 | 8/2012 |
| WO | 2012/148864 A1 | 11/2012 |
| WO | 2013/118859 A1 | 8/2013 |
| WO | 2014/078415 A1 | 5/2014 |
| WO | 2014/092107 A1 | 6/2014 |
| WO | 2014/108827 A1 | 7/2014 |
| WO | 2015/020197 A1 | 2/2015 |

OTHER PUBLICATIONS

Sun et al., "Outer-Selective Pressure-Retarded Osmosis Hollow Fiber Membranes from Vacuum-Assisted Interfacial Polymerization for Osmotic Power Generation," Environmental Science & Technology, 47: 13167-13174 (2013).

Veríssimo et al., "Thin-film composite hollow fiber membranes: An optimized manufacturing method," Journal of Membrane Science, 264: 48-55 (2005).

Wang et al., "Characterization of novel forward osmosis hollow fiber membranes," Journal of Membrane Science, 355: 158-167 (2010).

Han et al., "Thin film composite forward osmosis membranes based on polydopamine modified polysulfone substrates with enhancements in both water flux and salt rejection," Chemical Engineering Science, 80: 219-231 (2012).

International Search Report issued in corresponding International Patent Application No. PCT/JP2015/073434 dated Nov. 2, 2015.

International Preliminary Report on Patentability and Written Opinion issued in corresponding International Patent Application No. PCT/JP2015/073434 dated Feb. 21, 2017.

\* cited by examiner (c)

(d)

(a)

(b)

(e)

(f)

(g)

(h)

(e)

(g)

(f)

(h)

COMPOSITE HOLLOW FIBER MEMBRANE MODULE AND MANUFACTURING METHOD THEREFOR

TECHNICAL FIELD

The present invention relates to a composite hollow fiber membrane module and a method for manufacturing the same. More particularly, the present invention relates to a composite hollow fiber membrane module having selective permeability that is used to separate solvents by removing solids or solutes from a liquid mixture, and to a method for manufacturing that composite hollow fiber membrane module. More specifically, the present invention relates to a composite hollow fiber membrane module manufactured by forming a separation active layer, composed of a polymer thin film having selective permeability, on the inner surface of a microporous hollow fiber supporting membrane by so-called interfacial polymerization, and to a method for manufacturing that composite hollow fiber membrane module.

BACKGROUND ART

Forward osmosis technology is known to be used as a method for producing purified water (Patent Documents 1 and 2).

Forward osmosis technology is a technology whereby, after contacting raw water to be purified with an induction solution containing water and high concentration of separable solute through a semipermeable membrane, and extracting only the water in the raw water into the induction solution, purified water is obtained by removing the solute from the induction solution. A water purification system that uses forward osmosis technology does not require the creation of an artificial pressure difference since extraction of water from the raw water into the induction solution is driven by an osmotic pressure difference.

In general, composite membranes used as positive osmosis membranes are manufactured by forming an active layer composed of a thin film on the surface of a supporting membrane. The formation of this active layer is carried out by, for example, a coating method, interfacial polymerization or plasma polymerization.

Interfacial polymerization is a technology consisting of respectively dissolving two types of reactive monomers in water and an organic solvent not miscible with water, and forming a polymer by enabling the monomers to react at the interface of the two solutions by allowing the solutions to make contact. A composite membrane capable of being used as a forward osmosis membrane can be obtained by carrying out this interfacial polymerization reaction on the surface of a microporous supporting membrane. The manufacturing of a composite membrane by a commonly known interfacial polymerization method is carried out in the manner indicated below using two types of reactive compounds capable of forming a polymer through the mutual reaction thereof.

Namely, a first solution containing one of the reactive compounds and a second solution containing the other reactive compound while also being immiscible with the first solution are prepared. A microporous supporting membrane is then immersed in the first solution followed by immersing in the second solution after having removed any excess first solution. As a result, interfacial polymerization of the reactive compounds is carried out on the surface of the microporous supporting membrane. A composite membrane having a thin film on the surface of a microporous supporting membrane is then formed by removing the solvent of the second solution.

Methods for forming a polymer thin film on the outer surface of a microporous supporting membrane in the form of hollow fibers by interfacial polymerization are well known. For example, a method is known whereby a guide roll is provided in a reaction solution tank and a microporous hollow fiber supporting membrane is continuously immersed in the reaction solution by passing through this guide roll (Patent Documents 3 and 4).

Technology for forming a polymer film on the outer surface of hollow fibers offers the advantage of being able to be carried out continuously following a spinning step. However, this technology has the problem of damaging the formed polymer film due to contact with the guide roll and contact between hollow fibers when filling into a module.

In contrast, in the case of forming a polymer thin film on the inner surface of hollow fibers, the polymer film can be formed after having integrated the hollow fibers into a module, thereby preventing damage to the polymer film during subsequent handling.

A known example of a method for forming a polymer thin film on the inner surface of hollow fibers consists of forming a liquid film of a first solution on the inner surface of the hollow fibers by filling the first solution into the hollow portions of the hollow fibers and then removing any excess solution using high-pressure air, followed by passing a second solution through the hollow portions of the hollow fibers (Patent Document 5).

Another known method consists of forming a polymer thin film on the inner surface of hollow fibers by coating a prepolymer or oligomer onto the inner surface of the hollow fibers followed by post-crosslinking (Patent Document 6).

PRIOR ART DOCUMENTS

Patent Documents

Patent Document 1: Japanese Translation of PCT International Application Publication No. 2014-512951
Patent Document 2: International Publication No. WO 2014/078415
Patent Document 3: Japanese Unexamined Patent Publication No. S63-205108
Patent Document 4: Japanese Unexamined Patent Publication No. H2-6848
Patent Document 5: Chinese Patent No. 101269301
Patent Document 6: Japanese Examined Patent Publication No. H3-35971

DISCLOSURE OF THE INVENTION

Problems to be Solved by the Invention

The following problems occur according to the technology described in Patent Document 5.

Namely, it is difficult to ensure that high-pressure air flows from the end surface of the module over the entire surface thereof at uniform pressure. Thus, the generation of a pressure difference between air that passes over the outer periphery and air that passes over the central portion of the module in the radial direction cannot be avoided. As a result, since a difference occurs in the thickness of the film of the liquid film of the first solution formed, a difference occurs in the thickness of an active separation layer composed of the formed polymer thin film. A difference also occurs in the thickness of the active separation layer formed since a difference also occurs in the thickness of the liquid film between the upper portion of the module (upstream side of the air flow) and lower portion of the module (downstream side of the air flow) due the pressure loss that occurs during the flow of high-pressure air.

The surface of a thin film formed according to the technology described in Patent Document 6 is extremely smooth, thereby making water permeability inadequate for practical use.

When a separation active layer composed of a polymer thin film is formed on the inner surface of hollow fibers according to the prior art, a composite hollow fiber module is only able to be obtained that has uneven thickness in both the radial direction and lengthwise direction of the module. Such a module has problems that prevent it from demonstrating the required level of performance, such as excessive variation in water permeability or excessive reverse salt flux for each product.

The present invention attempts to improve on the aforementioned problems. Thus, an object of the present invention is to provide a composite hollow fiber membrane module that stably demonstrates high performance by having a separation active layer that exhibits little variation in average thickness in the radial direction and lengthwise direction, and a method for manufacturing that composite hollow fiber membrane module.

Means for Solving the Problems

The inventors of the present invention proceeded with extensive studies to eliminate the aforementioned problems, thereby leading to completion of the present invention.

The present invention is as indicated below.

[1] A forward osmosis composite hollow fiber membrane module having hollow fiber bundles composed of a plurality of hollow fibers; wherein, the hollow fibers are hollow fibers provided with a separation active layer of a polymer thin film on the inner surface of a microporous hollow fiber supporting membrane, the membrane area of the hollow fiber bundles is 1 m$^2$ or more, and the coefficient of variation of average thickness of the separation active layer in the radial direction and lengthwise direction of the hollow fiber bundles, as calculated according to a method consisting of measuring the mass of the separation active layer portion in a scanning electron microscope image of a cross-section of the separation active layer in the direction of thickness, is 0% to 60%.

[2] The module described in [1], wherein a ratio L2/L1 between a length L1 of the interface between the separation active layer and the hollow fiber supporting membrane and a length L2 of the supporting active layer surface in a scanning electron microscope image of a cross-section of the separation active layer in the direction of thickness is 1.1 to 5.0.

[3] The module described in [1] or [2], wherein the ratio L2/L1 is 1.15 to 4.0.

[4] The module described in [1] or [2], wherein the ratio L2/L1 is 1.2 to 3.0.

[5] The module described in any of [1] to [4], wherein the coefficient of variation is 0% to 50%.

[6] The module described in any of [1] to [4], wherein the coefficient of variation is 0% to 40%.

[7] The module described in any of [1] to [4], wherein the coefficient of variation is 0% to 30%.

[8] The module described in any of [1] to [7], wherein the polymer is a polycondensation product of:

at least one or more types of a first monomer selected from polyfunctional amines, and, at least one or more types of a second monomer selected from the group consisting of polyfunctional acid halides and polyfunctional isocyanates.

[9] The module described in [8], wherein the polymer is at least one type selected from polyamide and polyurea.

[10] A method for manufacturing the module described in [8], comprising going through the steps of:

forming a liquid film of a first solution containing either the first monomer or the second monomer on the inner surface of a microporous hollow fiber supporting membrane, providing a pressure difference between the inside and outside of the microporous hollow fiber supporting membrane so that pressure on the inside is greater than pressure on the outside (inside pressure)>(outside pressure), and going through a step for contacting a second solution containing the other of the first monomer and the second monomer with the liquid film of the first solution.

[11] The method described in [10], wherein the pressure difference is generated by reducing pressure on the outside of the hollow fiber supporting membrane.

[12] The method described in [10], wherein the pressure difference is generated by applying pressure to the inside of the hollow fiber supporting membrane.

[13] The method described in [10], wherein the pressure difference is generated by applying different pressures to both the outside and inside of the hollow fiber supporting membrane.

[14] The method described in any of [10] to [13], wherein the pressure difference is 1 kPa to 100 kPa.

Effects of the Invention

In addition to the composite hollow fiber membrane module of the present invention having a uniform average thickness of the separation active layer throughout all hollow fibers in the module while also being able to achieve reduced thickness, the surface of the separation active layer has fine irregularities, thereby resulting in a large surface area. Consequently, the module has high water permeability, low reverse salt flux and stable performance. Thus, the composite hollow fiber membrane module can be preferably applied as a positive osmosis membrane, and can be preferably used in, for example, desalination of seawater, desalting of irrigation water, wastewater treatment, concentration of valuable resources, and advanced treatment of water produced accompanying excavation for oil and gas.

BEST MODE FOR CARRYING OUT THE INVENTION

Figure 1:
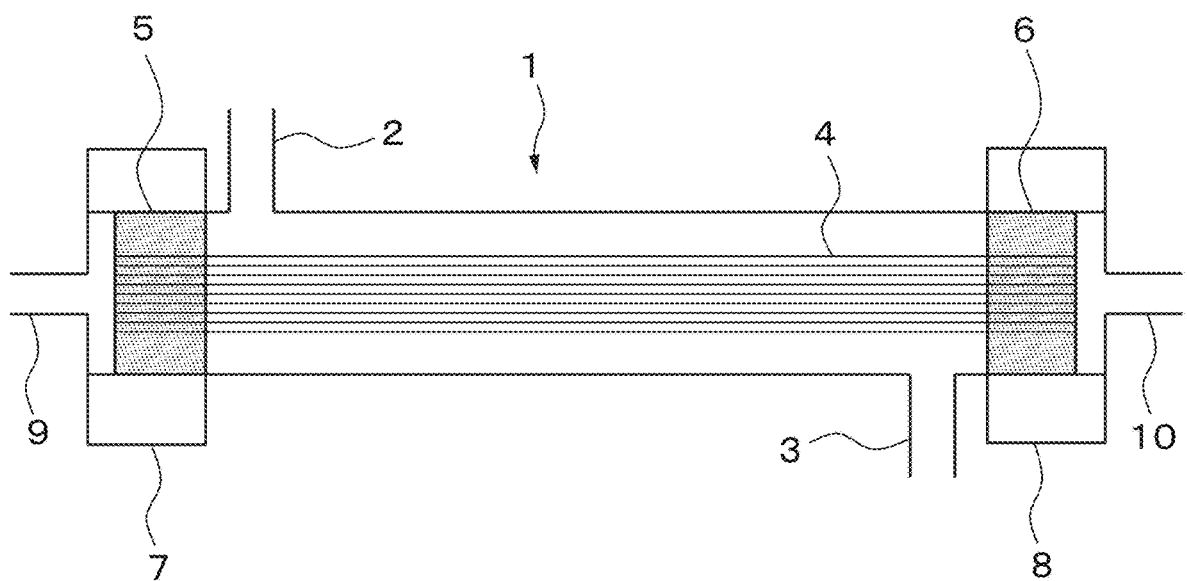
FIG. 1 is a cross-sectional view showing one example of the structure of the composite hollow fiber membrane module of the present invention.

The following provides a detailed explanation of one example of an embodiment of the present invention.

The forward osmosis composite hollow fiber membrane module of the present embodiment has hollow fiber bundles composed of a plurality of hollow fibers. The hollow fibers are hollow fibers provided with a separation active layer of a polymer thin film on the inner surface of a microporous hollow fiber supporting membrane, and the membrane area of the hollow fiber bundles is 1 m$^2$ or more and preferably 1 m$^2$ to 1,000 m$^2$ from the standpoint of practicality.

In order to prevent the separation active layer formed on the inner surface of the hollow fiber supporting membrane from being damaged during contact with a guide roll or during handling at the time of module formation, the forward osmosis composite hollow fiber membrane module of the present embodiment is preferably fabricated by forming the separation active layer on the inside of the hollow fiber supporting membrane after having first integrated the microporous hollow fiber supporting membrane into a module. Going through a step like this makes it possible to avoid subjecting the formed separation active layer to damage.

Water permeability of the forward osmosis composite hollow fiber membrane module of the present embodiment is preferably as high as possible. Water permeability of 4 kg/(m$^2$×hr) or more is considered to be required as a general rule in order to ensure water permeability that is equal to or better than that of modules having spatial occupation volume equal to that of commercially available membranes. Water permeability is preferably 200 kg/(m$^2$×hr) or less in order to avoid the risk of depleting the raw water being treated and the occurrence of precipitation when the raw water flows under conditions of as little pressure loss as possible.

Water permeability of a composite hollow fiber module in the present description refers to the amount of water that migrates from raw water to an induction solution due to osmotic pressure when the raw water to be treated and the induction solution having a higher concentration than the raw water are arranged with a forward osmosis membrane interposed there between, and is defined by equation (1) indicated below.

$$F=L/(M \times H) \quad (1)$$

F represents water permeability (kg/(m$^2$×hr)), L represents the amount of permeated water (kg), M represents the inner surface area (m$^2$) of the membrane, and H represents time (hr).

Reverse salt flux in the forward osmosis composite hollow fiber membrane module of the present embodiment is preferably as low as possible. If there is considerable reverse salt flux, this leads to contamination of the raw material or loss of induction solute. From this viewpoint, reverse salt flux in the forward osmosis composite hollow fiber membrane module of the present embodiment is preferably 0.1% or less, more preferably 0.05% or less and even more preferably 0.02% or less with respect to the aforementioned value of water permeability (kg/m$^2$/hr).

Reverse salt flux in a composite hollow fiber module in the present description refers to the amount of salt that migrates from the induction solution to raw water when the raw water to be treated and the induction solution having a higher concentration than the raw material are arranged with a forward osmosis membrane arranged there between, and is defined by equation (2) indicated below.

$$RSF=G/(M \times H) \quad (2)$$

RSF represents reverse salt flux (g/(m$^2$×hr)), G represents the amount of permeated salt (g), M represents the membrane area (m$^2$), and H represents time (hr).

The induction solution refers to a solution having a function that causes water to migrate from raw material through a semipermeable membrane by demonstrating osmotic pressure that is higher than the raw water containing a substance targeted for separation. This induction solution demonstrates high osmotic pressure as a result of containing a high concentration of an induction solute.

Examples of the aforementioned induction solute include salts readily soluble in water such as sodium chloride, potassium chloride, sodium sulfate, sodium thiosulfate, sodium sulfite, ammonium chloride, ammonium sulfate or ammonium carbonate; alcohols such as methanol, ethanol, 1-propanol or 2-propanol; glycols such as ethylene glycol or propylene glycol; polymers such as polyethylene oxide or propylene oxide; and copolymers of these polymers.

The microporous hollow fiber supporting membrane in the present embodiment refers to a membrane for supporting the separation active layer composed of a polymer thin film as previously described, and this membrane per se preferably does not substantially demonstrate separation performance with respect to the substance targeted for separation. Any microporous hollow fiber supporting membrane can be used for this microporous hollow fiber supporting membrane, including commercially available products.

The inner surface of the microporous hollow fiber supporting membrane in the present embodiment preferably has micropores having a pore diameter of preferably 0.001 μm to 0.1 μm and more preferably 0.005 μm to 0.05 μm. A structure that is as sparse as possible, provided strength is retained, is preferable for the structure extending to the outer surface of the microporous hollow fiber supporting membrane, excluding the inner surface, in order to reduce permeation resistance of a permeating fluid. The sparse structure of this portion is preferably in the form of, for example, a mesh, a finger-shaped void or a mixed structure thereof.

Permeability, which is represented by the amount of pure water that permeates through a fixed membrane area (inner surface area) of the microporous hollow fiber supporting membrane in the present embodiment for a certain amount of time when a certain pressure has been applied, is preferably 100 kg/m$^2$/hr/100 kPa or more and more preferably 200 kg/m²/hr/100 kPa or more. If permeability of the supporting membrane is excessively low, the resulting composite hollow fiber membrane module also becomes susceptible to low permeability.

Permeability of the supporting membrane is preferably the higher the better within a range that does not impair mechanical strength of the supporting membrane. In general, mechanical strength decreases as permeability increases. Consequently, the permeability of the microporous hollow fiber supporting membrane in the present embodiment is preferably 50,000 kg/m²/hr/100 kPa or less and more preferably 10,000 kg/m²/hr/100 kPa or less as a general rule.

Any material can be used for the material of this microporous hollow fiber supporting membrane provided it can be formed into a microporous hollow fiber supporting membrane. In the manufacturing of a composite membrane using the preferable manufacturing method of the present embodiment, it is necessary that the composite membrane not be subjected to chemical damage caused by the monomer solution or other components used. Thus, from the viewpoint of chemical resistance, film formability or durability, the material of the microporous hollow fiber supporting membrane preferably has for a main component thereof at least one type of material selected from polysulfone, polyethersulfone, polyacrylonitrile, polyethylene, polypropylene, polyamide, polyvinylidene fluoride and cellulose acetate, more preferably has for a main component thereof at least one type of material selected from polysulfone and polyethersulfone, and is more preferably polyethersulfone.

Although there are no particular limitations on the fiber diameter of the microporous hollow fiber supporting membrane used in the present embodiment, when considering film formation stability, handling ease and membrane area when integrating into a module, fibers having an outer diameter within the range of 100 µm to 3,000 µm and inner diameter within the range of 30 µm to 2,500 µm are preferable, while those having an outer diameter within the range of 200 µm to 1,500 µm and inner diameter within the range of 50 µm to 1,000 µm are more preferable. Such a microporous hollow fiber supporting membrane can be manufactured by a known method such as wet and dry film formation, melt film formation or wet film formation using a material selected from among the aforementioned materials.

The microporous hollow fiber supporting membrane module used in the present embodiment is obtained by integrating the aforementioned microporous hollow fiber supporting membrane into a module. A cylindrical housing having a diameter of 2 inches to 20 inches can be used for the module housing, and the microporous hollow fiber supporting membrane can be integrated into a module using a urethane-based or epoxy-based adhesive. The microporous hollow fiber supporting membrane has a structure in which hollow fiber bundles are housed within a module and the ends of the fiber bundles are immobilized with the aforementioned adhesive. The adhesive is solidified so as not to occlude the openings in each of the hollow fibers. This makes it possible to ensure the fluid-transportability of the hollow fibers. The aforementioned module is preferably provided with conduits that communicate with the inside of the fiber bundles but do not communicate with the outside, and conduits that communicate with the outside of the hollow fiber bundles but do not communicate with the inside. As a result of employing this configuration, the inside and outside of the hollow fiber bundles can be placed under different pressures, and can be preferably used to form a separation active layer (to be subsequently described) of the present embodiment.

In the present embodiment, a separation active layer composed of a polymer thin film can be formed by an interfacial polymerization reaction and substantially has separation performance.

The polymer thin film is preferably as thin as possible provided there are no pinholes. The polymer thin film must have a suitable thickness in order to maintain mechanical strength and chemical resistance. Thus, when considering film formation stability and permeability, the thickness of the polymer thin film is preferably 0.1 µm to 3 µm and more preferably 0.2 µm to 2 µm.

In the present embodiment, membrane area refers to the value defined by the following equation (3) based on the length, inner diameter and number of hollow fibers within the module excluding the adhered portion. In the equation, a represents membrane area (m²), b represents the length of the hollow fibers excluding the adhered portion (m), c represents the inner diameter of the hollow fibers (m), and n represents the number of hollow fibers.

$$a = c \times \pi \times b \times n \quad (3)$$

The membrane area of the module is preferably 1 m² or more and more preferably 1.5 m² or more from the viewpoint of provided for practical use.

The polymer in the aforementioned polymer thin film is preferably a polycondensation product of, for example, at least one or more types of a first monomer selected from among polyfunctional amines, and at least one or more types of a second monomer selected from the group consisting of polyfunctional halides and polyfunctional isocyanates. Specific examples thereof include polyamides obtained by an interfacial polycondensation reaction between a polyfunctional amine and a polyfunctional halide, and polyureas obtained by an interfacial polymerization reaction between a polyfunctional amine and a polyfunctional isocyanate. Separation function in the case of using these polymer thin films as a separation active layer refers to performance that separates pure water from a solute such as an ion dissolved therein.

There are no particular limitations on the type or combination of the aforementioned first monomer and second monomer or on the type of solvent used (to be subsequently described) provided both monomers form a polymer thin film by immediately undergoing a polymerization reaction at the interface thereof. At least one of the first monomer and the second monomer preferably contains a reactive compound having three or more reactive groups. This is more preferable from the viewpoint of film strength since a thin film is formed from a three-dimensional polymer.

Examples of the aforementioned polyfunctional amines include polyfunctional aromatic amines, polyfunctional aliphatic amines, monomers having a plurality of reactive amino groups and prepolymers thereof.

The aforementioned polyfunctional aromatic amines refer to aromatic amino compounds having two or more amino groups in a single molecule thereof, specific examples thereof include m-phenylenediamine, p-phenylenediamine, 3,3'-diaminodiphenylmethane, 4,4'-diaminodihenylamine, 4,4'-diaminodiphenylether, 3,4'-diaminodiphenylether, 3,3'-diaminodiphenylamine, 3,5-diaminobenzoic acid, 4,4'-diaminodiphenylsulfone, 3,3'-diaminodiphenylsulfone, 3,4'-diaminodiphenylsulfone, 1,3,5-triaminobenzene and 1,5-diaminonaphthalene, and these can be used alone or as a mixture thereof. In the present invention, one or more types selected from among m-phenylenediamine and p-phenylenediamine are used particularly preferably.

The aforementioned polyfunctional aliphatic amines refer to aliphatic amino compounds having two or more amino groups in a single molecule thereof, specific examples thereof include primary amines having a cyclohexane ring such as 1,3-diaminocyclohexane, 1,4-diaminocyclohexane, 4,4'-bis(para-aminocyclohexyl)methane, 1,3-bis-(aminomethyl) cyclohexane, 2,4-bis-(aminomethyl)cyclohexane or 1,3,5-triaminocyclohexane; secondary amines having a piperazine ring such as piperazine, 2-methylpiperazine, ethylpiperazine or 2,5-dimethylpiperazine; secondary amines having a piperidine ring such as 1,3-bis(4-piperidyl)methane, 1,3-bis(4-piperidyl)propane or 4,4'-bipiperidine; amines having both primary and secondary amino groups such as 4-(aminomethyl)piperidine; as well as ethylenediamine, propylenediamine, 1,2-propanediamine, 1,2-diamino-2-methylpropane, 2,2-dimethyl-1,3-propanediamine, tris(2-aminoethyl)amine, N,N'-dimethylethylenediamine and N,N'-dimethylpropanediamine, and these can be used alone or as a mixture thereof. A mixture of these polyfunctional amines and the aforementioned polyfunctional aromatic amines can also be used.

Examples of the aforementioned monomers having a plurality of reactive amino groups include polyethyleneimine, amine-modified polyepichlorohydrin and aminated polystyrene. Examples of the aforementioned prepolymers that are used preferably include prepolymers composed of one or more types of monomers selected from piperazine, 4-(aminomethyl)piperidine, ethylenediamine and 1,2-diamino-2-methylpropane.

Examples of the aforementioned polyfunctional halides include polyfunctional aromatic acid halides and polyfunctional aliphatic acid halides. These may have two or more functional groups so as to be able to form a polymer by reacting with the aforementioned polyfunctional amines.

The aforementioned polyfunctional aromatic acid halides refer to aromatic acid halide compounds having two or more acid halide groups in a single molecule thereof. Specific examples thereof include trimesic acid halide, trimellitic acid halide, isophthalic acid halide, terephthalic acid halide, pyromellitic acid halide, benzophenonetetracarboxylic acid halide, biphenyldicarboxylic acid halide, naphthalenedicarboxylic acid halide, pyridinedicarboxylic acid halide and benzenesulfonic acid halide, and these can be used alone or as a mixture thereof. In the present embodiment, trimesic acid chloride alone, a mixture of trimesic acid chloride and isophthalic acid chloride, or a mixture of trimesic acid chloride and terephthalic acid chloride is used particularly preferably.

The aforementioned polyfunctional aliphatic acid halides refer to aliphatic acid halide compounds having two or more acid halide groups in a single molecule thereof. Specific examples thereof include alicyclic polyfunctional acid halide compounds such as cyclobutanedicarboxylic acid halide, cyclopentanedicarboxylic acid halide, cyclopentanetricarboxylic acid halide, cyclopentanetetracarboxylic acid halide, cyclohexanedicarboxylic acid halide or cyclohexanetricarboxylic acid halide; as well as propanetricarboxylic acid halide, butanetricarboxylic acid halide, pentanetricarboxylic acid halide, succinic acid halide and glutaric acid halide. These can be used alone or as a mixture thereof, and a mixture of these polyfunctional aliphatic halides and the aforementioned polyfunctional aromatic acid halides can also be used.

Examples of the aforementioned polyfunctional isocyanates include ethylene diisocyanate, propylene diisocyanate, benzene diisocyanate, toluene diisocyanate, naphthalene diisocyanate and methylenebis(4-phenyl isocyanate).

The aforementioned first and second monomers are subjected to interfacial polymerization in the form of a solution obtained by dissolving each of these monomers in a suitable solvent.

In the present description, the first solution refers to a solution containing a monomer first contacted by the microporous hollow fiber supporting membrane, while the second solution refers to a solution containing a monomer that contacts the supporting membrane after having been contacted by the first solution and forms a polymer by reacting with the monomer in the first solution. One of either the first monomer or the second monomer is contained in the first solution and the other is contained in the second solution. Although either monomer may be contained in either solution, a mode in which both monomers are contained in one solution is not preferable.

There are no particular limitations on the solvent of the first solution and solvent of the second solution provided they dissolve the monomer respectively contained therein and do not damage the microporous hollow fiber supporting membrane by forming a liquid-liquid interface in the case both solutions make contact. Examples of solvents include, in the case of the first solution, water or alcohol either alone or in the form of a mixture thereof, and in the case of the second solution, hydrocarbon-based solvents such as n-hexane, cyclohexane, n-heptane, n-octane, n-nonane or n-decane either alone or in the form of a mixture thereof. Selection of the solvents as described above causes the first solution and the second solution to become immiscible, thereby enabling interfacial polymerization to proceed as expected.

Selection of the first monomer for the monomer contained in the first solution and selection of the second monomer for the monomer contained in the second solution are each preferable.

The concentrations of these reactive compounds contained in the first solution and second solution vary according to such factors as the types of monomers and their distribution coefficients in the solvents, there are no particular limitations thereon. The concentrations may be suitably set by a person with ordinary skill in the art.

For example, in the case of using an aqueous m-phenylenediamine solution for the first solution and using an n-hexane solution of trimesic acid chloride for the second solution, the concentration of m-phenylenediamine is preferably 0.1% by weight to 10% by weight and more preferably 0.5% by weight to 5% by weight. The concentration of trimesic acid chloride is preferably 0.01% by weight to 10% by weight and more preferably 0.1% by weight to 5% by weight. If the concentrations of these solutions are excessively low, the formation of a thin film by interfacial polymerization is incomplete and there is increased susceptibility to the occurrence of defects, thereby inviting a decrease in separation performance.

Conversely, if the concentrations are excessively high, in addition to the formed thin film being excessively thick resulting in a decrease in permeability, the amount of residual unreacted substances in the film increases, thereby resulting in the possibility of a detrimental effect on membrane performance.

In the case of the generation of acid during progression of the interfacial polymerization reaction, an acid scavenger in the form of a base can be added to the aforementioned first solution or second solution. A surfactant for improving wettability with the microporous hollow fiber supporting membrane or catalyst for accelerating the reaction may also be added as necessary.

Examples of the aforementioned acid scavenger include caustic bases such as sodium hydroxide; sodium phosphates such as trisodium phosphate; carbonates of soda such as sodium carbonate; and tertiary amines such as trimethylamine, triethylamine or triethylenediamine. Examples of the aforementioned surfactant include sodium lauryl sulfate and sodium lauryl benzenesulfonate. Examples of the aforementioned catalyst include dimethylformamide. These can be preliminarily contained in the aforementioned first solution or second solution.

An example of the structure of the hollow fiber membrane module of the present embodiment is shown in FIG. 1.

A hollow fiber membrane module 1 has a structure in which fiber bundles composed of a plurality of hollow fibers 4 are filled into a cylindrical body and both ends of the hollow fiber bundles are attached to the cylinder with adhesive immobilized portions 5 and 6. The aforementioned cylindrical body has shell side conduits 2 and 3 in the lateral surfaces thereof, and is sealed by headers 7 and 8. The adhesive immobilized portions 5 and 6 are respectively solidified so as not to occlude the openings of the hollow fibers. The aforementioned headers 7 and 8 respectively have core side conduits 9 and 10 that communicate with the inside (hollow portion) of the hollow fibers 4 but do not communicate with the outside. These conduits enable liquid to be introduced to or extracted from the inside of the hollow fibers 4. The aforementioned core side conduits 9 and 10 communicate with the outside of the hollow fibers 4 but do not communicate with the inside.

In the present description, the inside of the hollow fibers is referred to as the core side, while the space between the outside of the hollow fibers and cylinder is referred to as the shell side. The hollow fiber membrane module of the present embodiment employs a structure in which liquid flowing through the core side and liquid flowing through the shell side only come in contact through a hollow fiber membrane. A pressure difference can be provided between the inside and outside of the hollow fibers by applying respectively different pressures to the shell side conduits 2 and 3 and core side conduits 9 and 10.

In the present embodiment, a first solution containing one of either the first monomer or the second monomer is filled into the core side of a microporous hollow fiber supporting membrane module after which a pressure difference is provided between the core side and shell side followed by passing through a second solution that is immiscible with the first solution and contains the other of the first monomer and second monomer to carry out a reaction between the first monomer and the second monomer on the surface of the microporous hollow fiber supporting membrane, form a polymer thin film, and manufacture the target composite hollow fiber module.

The method used to provide a pressure difference between the core side and the shell side is arbitrary. Examples thereof include a method that reduces pressure on both the core side and shell side; a method that reduces pressure on the shell side and opens the core side to atmospheric pressure; a method that opens the shell side to atmospheric pressure and increases pressure on the core side; and a method that increases pressure on both the core side and shell side, and any of these methods can be selected.

In the present embodiment, the pressure on the shell side is preferably set lower than the pressure on the core side.

As a result of providing a pressure difference as previously described (core side pressure>shell side pressure) after having filled the first solution into the core side, excess first solution enters the micropores of the supporting membrane and a thin film of the first solution having a comparative uniform thickness is thought to be formed over the entire inside of the module on the inner surface of the supporting membrane.

In the present embodiment, the thickness of the separation active layer composed of a polymer thin film formed on the inner surface of the microporous hollow fiber supporting membraned of the composite hollow fiber module is intimately related to the thickness of the liquid film of the first solution. The thickness of this liquid film can be adjusted according to such factors as the pressure difference acting on the module between the core side and shell side, the amount of time during which that pressure difference is maintained or the amount of surfactant added to the first solution.

Although the thickness of the separation active layer is preferably 0.1 µm to 3 µm as was previously described, it is more preferably 0.2 µm to 2 µm. In order to form a separation active layer of this thickness, the pressure difference between the core side and shell side is preferably 1 kPa to 500 kPa, more preferably 5 kPa to 300 kPa and even more preferably 10 kPa to 100 kPa. The amount of time during which this pressure difference is maintained is preferably 1 minute to 100 minutes and more preferably 10 minutes to 50 minutes. The amount of surfactant added to the first solution is preferably 0.01% by weight to 1% by weight and more preferably 0.05% by weight to 0.5% by weight based on the total weight of the first solution.

The thickness of the liquid film of the first solution decreases the greater the pressure difference and the longer the amount of time during which that pressure difference is maintained, while the thickness conversely increases in the opposite case. If the thickness of the liquid film is excessively small, locations occur where the liquid film is not formed even if the thickness of the liquid film is only slightly uneven, thereby causing defects in the separation active layer. If the thickness of the liquid film is excessively large, there are cases in which adequate permeability is unable to be obtained.

In the method for manufacturing the forward osmosis composite hollow fiber membrane module of the present embodiment, the pressure difference provided between the core side and shell side is uniform from the outermost peripheral portion to the central portion of the hollow fibers present within the module, and is also uniform from one end to the other end of the hollow fibers present within the module. As a result, the thickness of the liquid film of the first solution formed at each location is uniform, and the thickness of the polymer active layer formed on the basis thereof is also uniform. Thus, there is little variation in permeability of liquid at each location, thereby making it possible to stably demonstrate high performance as a composite hollow fiber membrane module.

According to methods of the prior art for forming a liquid film of a first solution on the inside of hollow fibers using the flow of high-pressure air, variations in the average thickness of the separation active layer at each of the aforementioned locations increases as the length of the module increases and as the diameter of the module increases. In the method for manufacturing a composite hollow fiber membrane module of the present embodiment, however, the average thickness at each location is substantially uniform. This effect of the present invention is expressed even more remarkably the larger the size of the module. In practical terms, however, it is convenient to make the length of the module to be 50 cm to 300 cm and the diameter of the module to be 2 inches to 20 inches. The effects of the present invention are naturally demonstrated even in the case of a module having a length and diameter less than or greater than these dimensions.

In the present invention, variations in the average thickness of the separation active layer of the hollow fibers present in the composite hollow fiber separation module at each location within the module are expressed as the coefficient of variation. Coefficient of variation refers to the value obtained by dividing the standard deviation of the value at each measured location by the average value, and is indicated as a percentage (%). Each measured location refers to a total of nine locations consisting of both ends and the central portion of the module for each of three locations consisting of the outer peripheral portion, intermediate portion and central portion of the module in the radial direction, and the number of measurements n is 1 or more (the number of measurements at each location is the same).

The thickness at each measured location is represented as the average thickness within a measuring range over a length of 5 µm to 100 µm. This length of the measuring range is preferably 5 µm to 50 µm, more preferably 5 µm to 20 µm and most preferably 13 µm. As will be subsequently described, the separation active layer in the composite hollow fiber membrane module of the present embodiment preferably has fine irregularities in the surface thereof. Thus, when evaluating thickness of the separation active layer, it is appropriate to evaluate thickness according to the average thickness over the aforementioned measuring range at each measured location. When comparing measured values of average thickness at a plurality of measured locations, the separation active layer in the composite hollow fiber membrane module of the present embodiment demonstrates little variation thereof. The direction of the aforementioned length of the measuring range when evaluating average thickness may be the lengthwise direction, the circumferential direction or a direction diagonal to the lengthwise direction of the hollow fibers. The direction of the length of the measuring range in a plurality of scanning electron microscope images used to calculate the average value may each be the same direction or may be mutually different directions.

The rate of variation in average thickness of the separation active layer from the outermost peripheral portion to the central portion of the hollow fibers present in the composite hollow fiber membrane module of the present invention and the coefficient of variation of average thickness of the separation active layer from one end to the other end of the hollow fibers present in the module are preferably 0% to 60%, more preferably 0% to 50%, even more preferably 0% to 40% and most preferably 0% to 30%.

In the present invention, the thickness of the separation active layer is calculated by a method consisting of measuring the mass of the separation active layer portion in a scanning electron microscope image of a cross-section of the separation active layer in the direction of thickness thereof. More specifically, average thickness is calculated by a technique consisting of printing out an image of a cross-section of the hollow fibers captured with a scanning electron microscope, measuring the mass thereof by cutting out a portion corresponding to the separation active layer, and calculating the area using a preliminarily prepared calibration curve.

In the composite hollow fiber membrane module of the present embodiment, there is little variation in average thickness of the separation active layer at each location within the module. Consequently, there are little variations in performance for each module, thereby making this preferable. The performance referred to here refers to water permeability and reverse salt flux.

The separation active layer in the composite hollow fiber membrane module of the present embodiment has a large number of fine irregularities in the surface thereof. The size of these irregularities in the surface of the separation active layer can be estimated from a ratio L2/L1 between the length L1 of the interface between the separation active layer and the hollow fiber supporting membrane and the length L2 of the separation active layer surface in a scanning electron microscope image of a cross-section of the separation active layer in the direction of thickness thereof. The ratio L2/L1 in a cross-sectional image of the separation active layer in the composite hollow fiber membrane module of the present embodiment is preferably 1.1 to 5.0, more preferably 1.15 to 4.0 and even more preferably 1.2 to 3.0. The ratio L2/L1 can be evaluated by using a scanning electron microscope image of a cross-section of a sample of the hollow fiber membrane.

Figure 6:
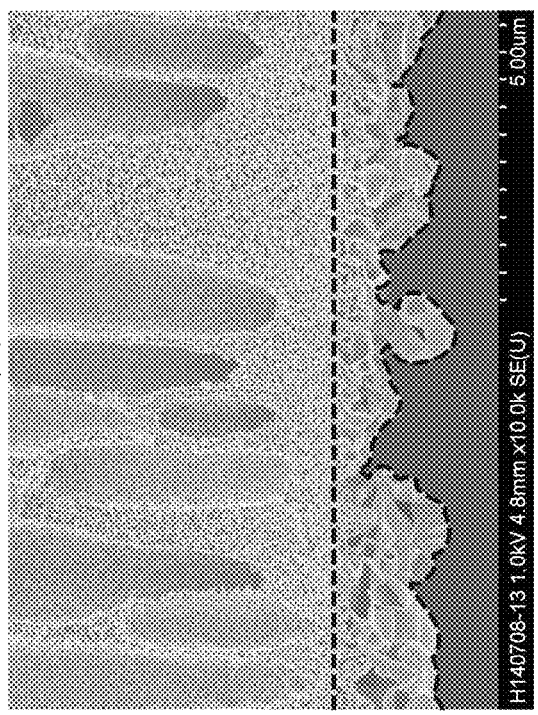
FIG. 6 depicts images obtained by emphasizing portions corresponding to the separation active layer in FIG. 3.
Figure 6:
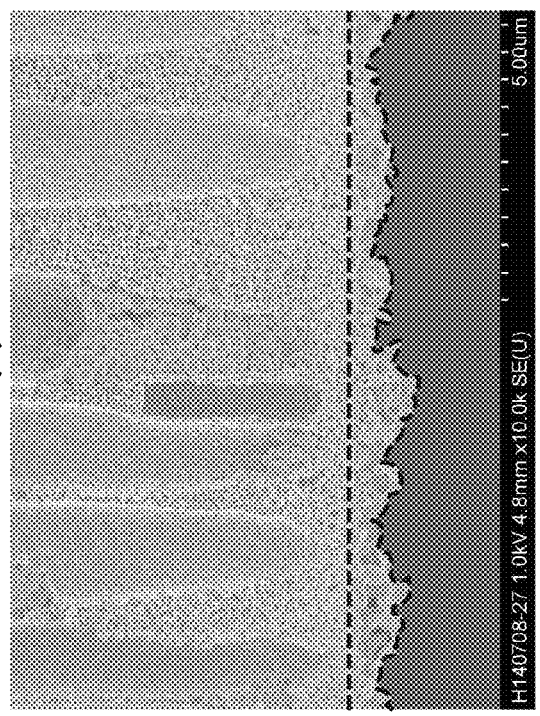
Figure 6:
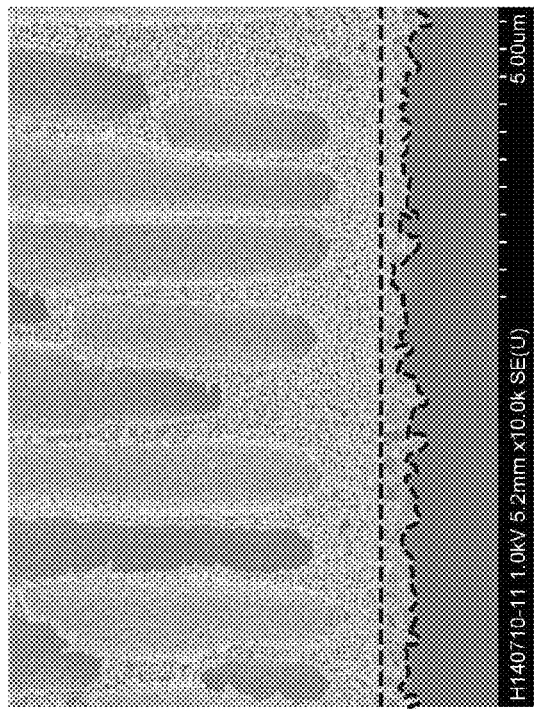
Figure 6:
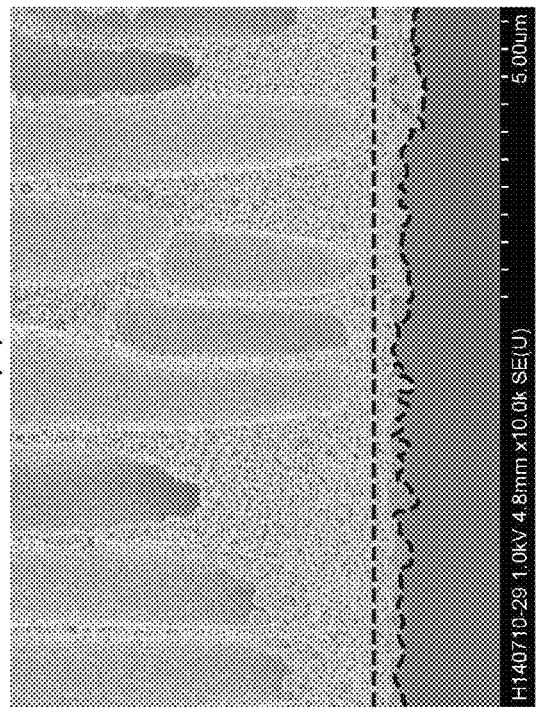

The following provides an explanation of a method used to evaluate the ratio L2/L1 with reference to FIG. 6(a). FIG. 6 depicts images captured with a scanning electron microscope of a cross-section of the hollow fibers in a composite hollow fiber membrane module obtained in Example 1 to be subsequently described. FIG. 6(a) is a cross-sectional image of hollow fibers sampled from the outer peripheral upper portion of the module that emphasizes those portions corresponding to the separation active layer.

In FIG. 6(a), those portions corresponding to the separation active layer are emphasized by respectively indicating the interface between the separation active layer and hollow fiber supporting membrane and the surface of the separation active layer with broken lines. In these images, the length from the left end to the right end in the image of the interface between the separation active layer and hollow fiber supporting membrane is defined as L1, the length from the left end to the right end in the image of the separation active layer is defined as L2, and each of these lengths are measured to calculate the ratio between the two of L2/L1 for use as an indicator of surface irregularity of the separation active layer.

The magnification factor for which the entire separation active layer in the direction of thickness thereof is contained in a single image over a range of 5,000× to 30,000× is used for the magnification factor, and a scanning electron microscope image in which the ratio between the value of length L1 of the interface and the average thickness of the separation active layer is set to 1.5 to 100 is used for the scanning electron microscope image in order to calculate the ratio L2/L1. Evaluation is then carried out by using scanning electron microscope images of a total of nine samples taken from both ends and the central portion of the module for three locations of the module consisting of the outer peripheral portion, intermediate portion and central portion in the radial direction, and using the average of each calculated value to determine the ratio L2/L1. The length of L2 is measured for the separation active layer formed on the supporting membrane over the range corresponding to L1.

The direction of a line extending from the left end to the right end in the scanning electron microscope image used to evaluate the ratio L2/L1 may be the lengthwise direction of the hollow fibers, the circumferential direction of the hollow fibers, or a direction diagonal to the lengthwise direction of the hollow fibers. The direction of a line extending from the left end to the right end in a plurality of scanning electron microscope images used to calculate the average value may be the same direction or mutually different directions.

The inventors of the present invention inferred the following with respect to the mechanism by which the surface of the separation active layer in the composite hollow fiber membrane module of the present embodiment is in the form of fine irregularities in this manner. However, the present invention is not restricted to the following theory.

The separation active layer in the composite hollow fiber membrane module of the present embodiment is preferably formed by interfacial polymerization. During interfacial polymerization, when a liquid film of a first monomer solution formed on the surface of the hollow fibers has contacted a second monomer solution, both solutions are thought to form a polymerized layer due to progression of polymerization at the interface in the absence of compatibility between the two solutions. As a result, the separation active layer formed is thought to have a form consisting of a large number of fine irregularities on the surface thereof. A separation active layer having a large number of fine irregularities on the surface thereof cannot be formed if the separation active layer is formed by a method other than interfacial polymerization.

Figure 2:
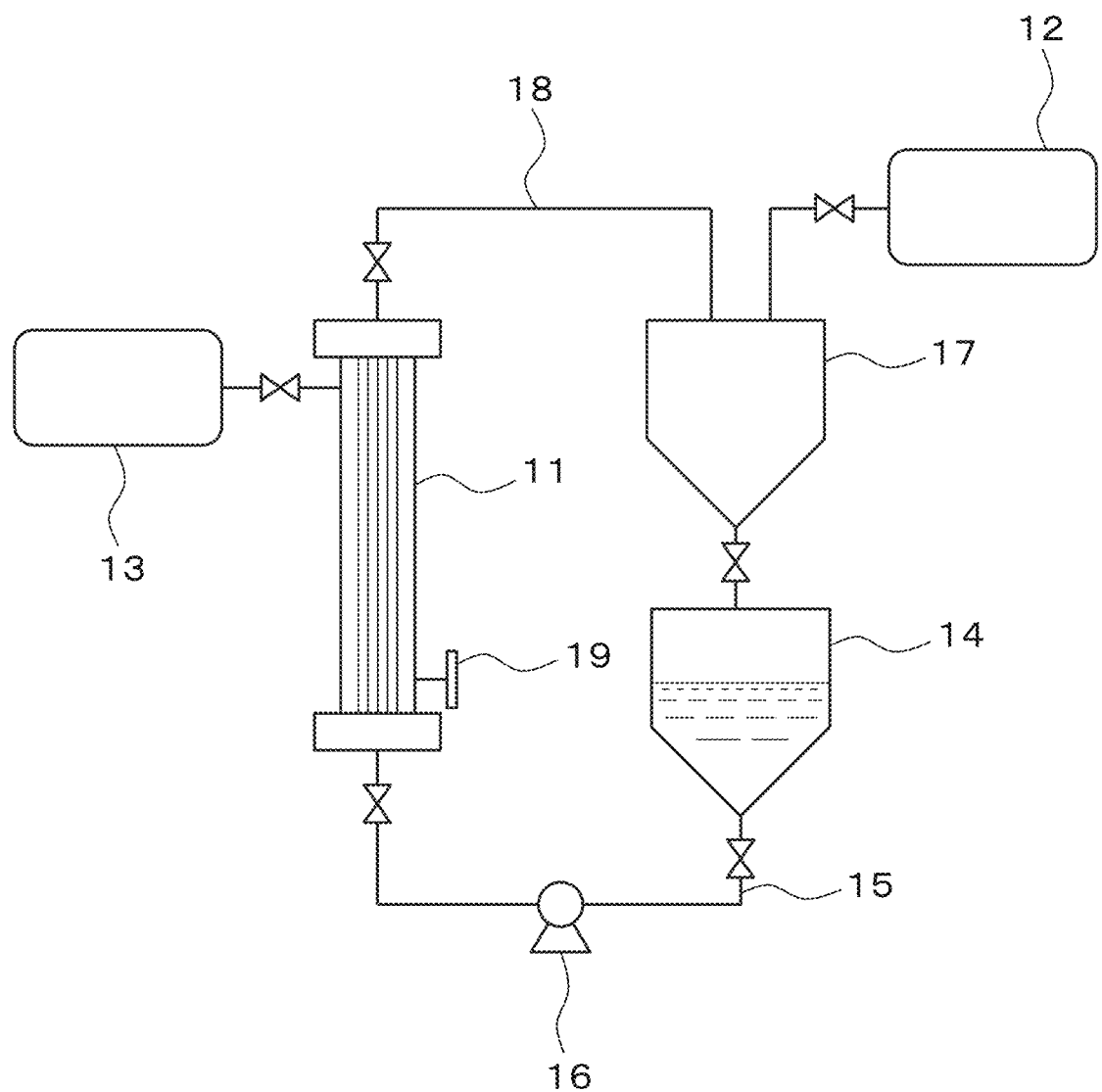
FIG. 2 is a schematic diagram showing one example of the configuration of a device allowing a microporous hollow fiber supporting membrane module to form a separation active layer according to the method of the present invention.

The following provides an explanation of a method used to manufacture the composite hollow fiber membrane module of the present embodiment with reference to FIG. 2.

In the device of FIG. 2, a line from a second solution storage tank 14 is connected to the entrance on the core side of a microporous hollow fiber supporting membrane module 11 having a first solution filled into the inside (core side) of a microporous hollow fiber supporting membrane, and a pump 16 that pumps the second solution is connected at an intermediate location thereof. A line 18 from a reaction drainage storage tank 17 is connected to the exit on the core side of the microporous hollow fiber supporting membrane module 11, and a core side pressure regulating device 12, which controls pressure on the inside of the hollow fibers of the microporous hollow fiber supporting membrane 11, is connected from that tank. An end cap 19 is fit into a lower conduit on the shell side of the microporous hollow fiber supporting membrane module 11, and shell side pressure regulating device 13, which controls shell pressure, is connected to an upper conduit.

Manufacturing of the composite hollow fiber membrane module in the present embodiment is carried out according to the procedure indicated below.

First, each line is connected to the microporous hollow fiber supporting membrane module 11 that has been filled with a first solution on the core side thereof (inside of the microporous hollow fiber supporting membrane). Next, a pressure difference is provided between the core side and the shell side by the core side pressure regulating device 12 and the shell side pressure regulating device 13 (core side pressure>shell side pressure). At this time, excess first solution present in the hollow fibers on the core side enters the micropores (or penetrates through to the shell side) due to the aforementioned pressure difference and forms a liquid film of uniform thickness on the inside of the hollow fibers. Next, the second solution from the storage tank 14 is fed to the inside of the hollow fibers by a pump and makes contact with the liquid film of the first solution. As a result of this contact, both monomers undergo interfacial polymerization resulting in the formation of a separation active layer composed of a polymer thin film on the inside of the microporous hollow fiber supporting membrane. Although there is the risk of fluctuation in the pressure on the core side when the second solution is fed, fluctuations in pressure are minimized by the function of the core side pressure regulating device 12.

The preliminarily set pressure difference between the core side and the shell side is preferably maintained when carrying out interfacial polymerization.

A polymer thin film is thus formed on the inside of the microporous hollow fiber supporting membrane thereby enabling the composite hollow fiber module of the present embodiment to be manufactured by this interfacial polymerization between the first monomer and the second monomer.

Since the thickness of the liquid film of the first monomer solution for forming the polymer thin film by interfacial polymerization in the composite hollow fiber module of the present invention is uniform between the outer peripheral portion and central portion of the module and between the upper portion and lower portion of the module, a uniform polymer layer is present throughout the entire module. Since the aforementioned interfacial polymerization proceeds at the interface between the first monomer solution and the second monomer solution, the surface of the polymer layer formed is of a form having a large number of fine irregularities.

EXAMPLES

Although the following provides a detailed explanation of the present invention based on examples thereof, the present invention is not limited by these examples.

[Experimental Method]

(1) Fabrication of Microporous Hollow Fiber Supporting Membrane and Hollow Fiber Membrane Module A 20% by weight hollow fiber spinning base solution was prepared by dissolving polyethersulfone (BASF SE, trade name: Ultrason) in N-methyl-2-pyrrolidone (Wako Pure Chemical Industries, Ltd.). The aforementioned base solution was filled into a wet-type hollow fiber spinning machine equipped with a double spinneret and extruded into a coagulation tank filled with water to form a hollow fiber by phase separation. The resulting hollow fiber was wound onto a winder. The diameter of the resulting hollow fiber was 1.0 mm, the inner diameter was 0.7 mm, and diameter of micropores of the inner surface was 0.05 μm and permeability was 1,020 kg/m$^2$/hr/100 kPa.

This hollow fiber was used as a microporous hollow fiber supporting membrane.

1,500 of the aforementioned microporous hollow fiber supporting membranes were filled into a cylindrical plastic housing have a diameter of 5 cm and length of 50 cm followed by immobilizing both ends with adhesive to fabricate a microporous hollow fiber membrane module having the structure shown in FIG. 1 and having an effective membrane inner surface area of 1.5 m$^2$.

In the module of FIG. 1, the hollow portion of each hollow fiber penetrates the adhesive immobilized portions 5 and 6, and the hollow portions thereof communicate with the core side conduits 9 and 10. The shell side conduits 2 and 3 communicate with the space in which the outside of the hollow fibers is present, but do not communicate with the hollow portion of the hollow fibers. Thus, by applying different pressures or reduced pressures to the core side conduits 9 and 10 and shell side conduits 2 and 3, a pressure difference can be provided between the inside and outside of the hollow fibers.

(2) Measurement of Water Permeability and Reverse Salt Flux of Composite Hollow Fiber Membrane Module A 50 L tank containing 30 L of pure water was connected with a line to the core side conduits (reference symbols 9 and 10 in FIG. 1) of composite hollow fiber membrane modules obtained in each of the examples and comparative examples followed by circulating the pure water with a pump. A conductivity meter was installed in the aforementioned tank to enable measurement of the migration of salt into the pure water. A 50 L tank filled with 20 L of saltwater having a concentration of 3.5% by weight was connected with a line to the shell side conduits (reference symbols 2 and 3 in FIG. 1) followed by circulating the saltwater with a pump. The core side tank and shell side tank were respectively placed on a balance to enable measurement of the migration of water. The amount of salt that migrated and the amount of water that migrated were respectively measured by operating simultaneously at a core side flow rate of 2.2 L/min and shell side flow rate of 8.8 L/min. Water permeability was then calculated from the amount of migrated water while reverse salt flux was calculated from the amount of migrated salt.

(3) Scanning Electron Microscopic Observation and Measurement of Average Thickness of Separation Active Layer The composite hollow fiber membrane modules obtained in each of the examples and comparative examples were disassembled followed by sampling one hollow fiber each from three locations consisting of the center of the module in the radial direction, a location equal to 50% of the radius, and an outermost peripheral portion. Each hollow fiber was then divided into three equal segments in the lengthwise direction to obtain nine samples. Each of these hollow fiber samples was subjected to freeze fracturing to prepare samples of hollow fiber cross-sections.

Sample preparation by freeze fracturing was carried out in the manner indicated below.

After immersing a hollow fiber in ethanol (Wako Pure Chemical Industries, Ltd.) and sealing both the hollow fiber and ethanol in a No. 00 gelatin capsule (Wako Pure Chemical Industries, Ltd.), the capsule was frozen by immersing for 5 minutes in liquid nitrogen. The hollow fiber of each frozen capsule was fractured using a chisel and hammer. The resulting fractured hollow fibers were subjected to freeze-drying to obtain samples of hollow fiber cross-sections for scanning electron microscopic observation.

Each of the aforementioned cross-sectional samples was observed with a scanning electron microscope. The samples were magnified using the Model S-4800 manufactured by Hitachi Ltd. under conditions of an acceleration voltage of 1.0 kV, standard working distance of 5 mm±0.7 mm and emission current setting of 10 μA±1 μA. The microscope images were printed out onto paper, the portion corresponding to the separation active layer was cut out, and the mass thereof was measured with a precision balance. That mass was converted to thickness (μm) of the separation active layer using a preliminarily prepared calibration curve. The average value of nine samples was taken to be the average thickness of the separation active layer followed by calculation of the standard deviation and coefficient of variation thereof.

Figure 10:
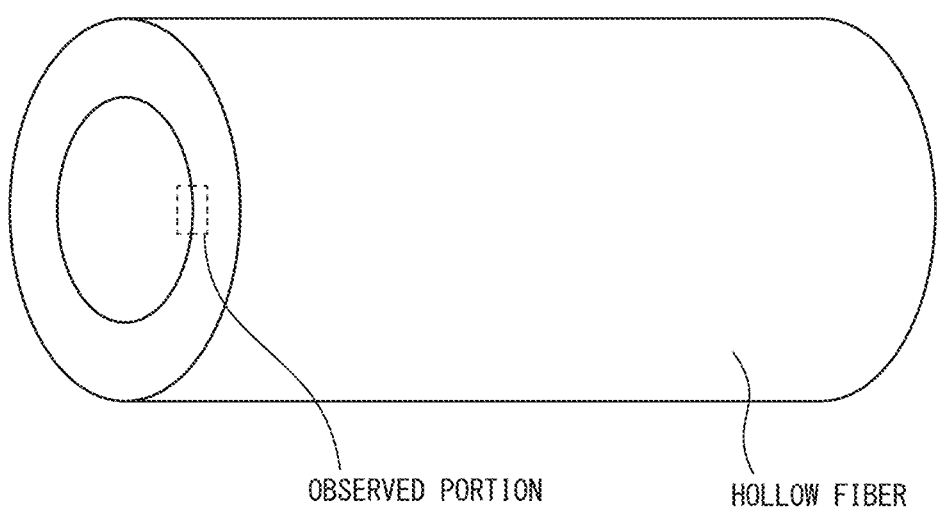
FIG. 10 is a reference drawing indicating the location where a sample is collected for scanning electron microscope imaging in the examples.

The length of the samples (images) used to measure mass is the length corresponding to a length of 13 μm in the circumferential direction for each sample (see FIG. 10).

(4) Measurement of Ratio L2/L1

The length of the interface between the separation active layer and hollow fiber supporting membrane was measured in the scanning electron microscope images of hollow fiber cross-sections obtained in (3) above and defined as L1. The length of the surface of the separation active layer (membrane surface on the side not contacting the hollow fiber supporting membrane) was measured and defined as L2. The ratio L2/L1 was then calculated and determined using these values.

Measurement of the lengths of L1 and L2 was carried out in the manner indicated below.

A piece of transparent, double-sided tape was affixed to the portion targeted for measurement of the scanning electron microscope image. Next, wires were attached from one end to the other end of the aforementioned images along lines following the interface and surface, respectively (such as the broken lines shown in FIG. 6) and any excess wire was cut off. The wires were then peeled off and measured for length. The wire used was wire made of resin or metal having a diameter of 0.1 mm that demonstrates superior flexibility and for which expansion and contraction during use can be ignored.

Example 1

100 g of m-phenylenediamine and 8 g of sodium lauryl sulfate were placed in a 5 L container followed by dissolving by further adding 4,892 g of water thereto to prepare 5 kg of a first solution used in interfacial polymerization.

8 g of trimesic chloride were placed in another 5 L container and dissolved by adding 3,992 g of n-hexane to prepare 4 kg of a second solution used in interfacial polymerization.

The first solution was filled into the core side (inside of the hollow fibers) of a microporous hollow fiber supporting membrane module, the liquid was extracted after allowing to stand undisturbed for 30 minutes, and the module was installed in the device shown in FIG. 2 with the inside of the hollow fibers being wetted by the first solution.

The core side pressure was set to normal pressure with the core side pressure regulating device 12, and the shell side pressure was set to a reduced pressure of 10 kPa as absolute pressure with the shell side pressure regulating device 13. After allowing to stand undisturbed for 30 minutes while in this state, interfacial polymerization was carried out by feeding the second solution to the core side for 3 minutes with the second solution feed pump 16 at a flow rate of 1.5 L/min while maintaining this pressure. The polymerization temperature was 25° C.

Next, the hollow fiber membrane module 11 was removed from the device and the n-hexane was dissipated by allowing nitrogen to flow through the core side for 30 minutes at 50° C. Both the shell side and the core side were washed with pure water to fabricate a forward osmosis composite hollow fiber membrane module.

The water permeability of this forward osmosis composite hollow fiber membrane module was 10.12 kg/(m²×hr) and the reverse salt flux was 1.20 g/(m²×hr).

Next, the aforementioned module was disassembled and hollow fibers were sampled from the previously described nine locations followed by measurement of average thickness of the separation active layer. The results are shown in Table 1.

Figure 3:
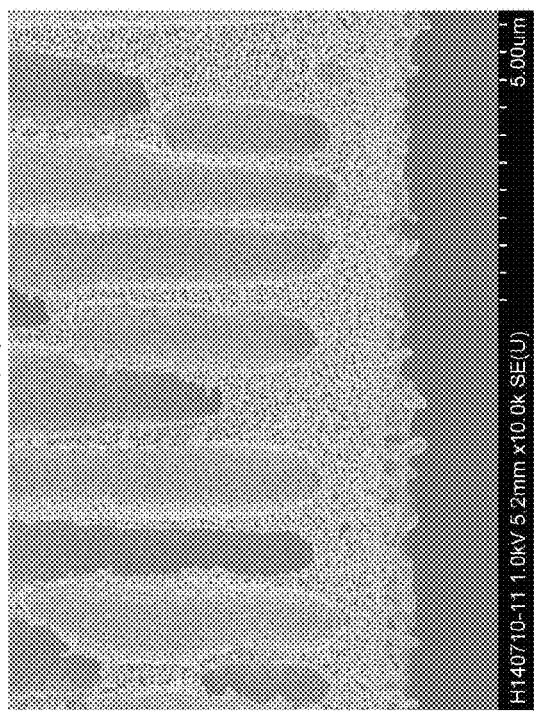
FIG. 3 depicts scanning electron microscope images of cross-sections of hollow fibers of a module of Example 1. The images consist of cross-sectional images of hollow fibers sampled from an (a) outer peripheral upper portion, (b) outer peripheral lower portion, (c) central upper portion, and (d) central lower portion.
Figure 3:
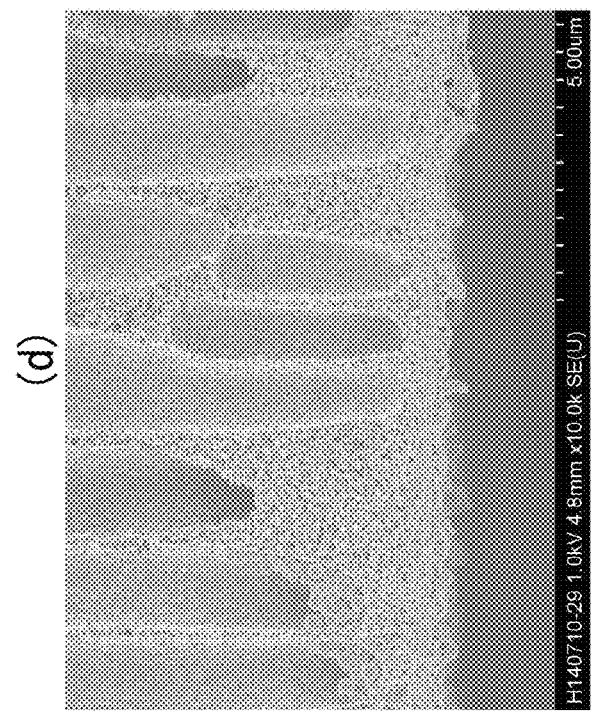
Figure 3:
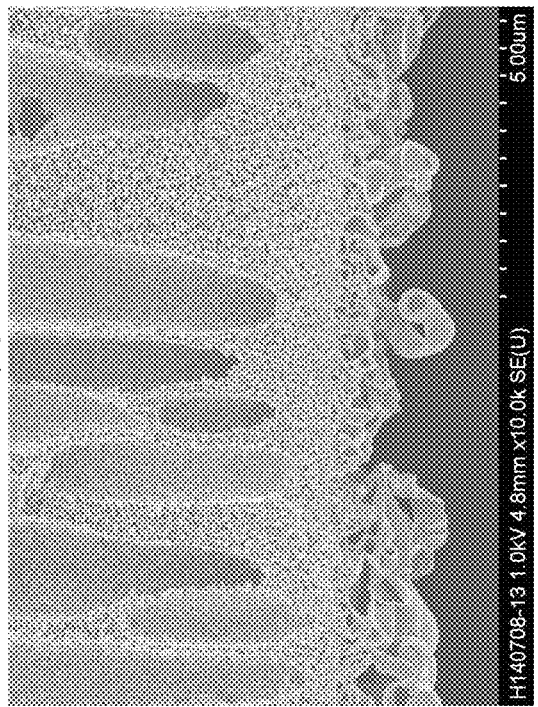
Figure 3:
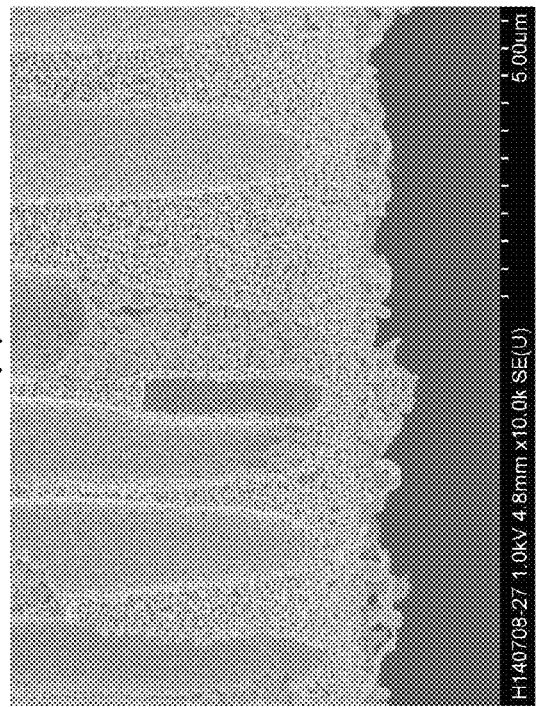
Figure 5:
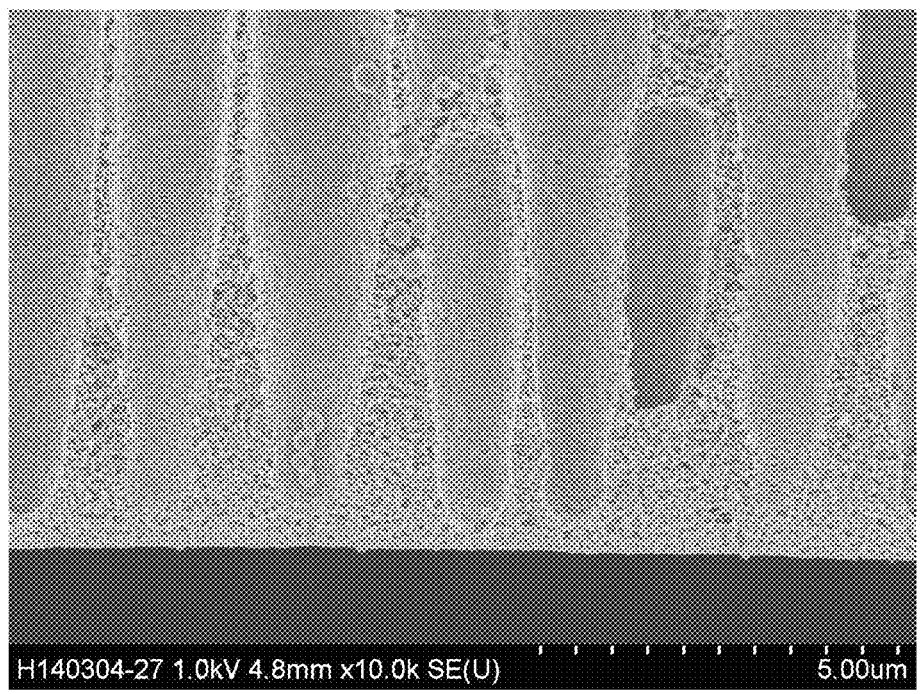
FIG. 5 depicts a scanning electron microscope image of a cross-section of a microporous hollow fiber supporting membrane prior to interfacial polymerization.

Scanning electron microscope images taken at that time are shown in FIG. 3. FIG. 3(a) is a cross-sectional image of a hollow fiber sampled from an outer peripheral upper portion, FIG. 3(b) is that sampled from an outer peripheral lower portion, FIG. 3(c) is that sampled from a central upper portion, and FIG. 3(d) is that sampled from a central lower portion. FIG. 5 depicts an image of a cross-section of a microporous hollow fiber supporting membrane prior to carrying out interfacial polymerization. FIG. 6 depicts images obtained by emphasizing portions corresponding to the separation active layer. Each of the images shown in FIGS. 6(*a*) to 6(*d*) are the respective images obtained by emphasizing portions corresponding to the separation active layer, set off between broken lines, in the images of FIG. 3 having the same reference symbols. Thus, the broken lines in FIGS. 6(*a*) to 6(*d*) respectively serve as cutting lines when measuring the mass of the separation active layer portions in the aforementioned section (3). The average thickness of each separation active layer calculated according to the method described in section (3) was as indicated below:

(a) 1.43 μm, (b) 0.79 μm, (c) 0.68 μm and (d) 0.63 μm.

Each of the values of the ratio L2/L1 obtained according to the method described in the aforementioned section (4) using the images of FIG. 6 were as indicated below:

(a) 1.46, (b) 1.33, (c) 1.25 and (d) 1.24.

Example 2

A forward osmosis composite hollow fiber membrane module was fabricated in the same manner as Example 1 with the exception of setting the shell side pressure during interfacial polymerization to 50 kPa. The water permeability of this forward osmosis composite hollow fiber membrane module was 9.81 kg/(m$^2$×hr) and the reverse salt flux was 0.99 g/(m$^2$×hr).

The results for average thickness of the separation active layer measured by disassembling this module are shown in Table 1.

Example 3

A forward osmosis composite hollow fiber membrane module was fabricated in the same manner as Example 1 with the exception of setting the shell side pressure during interfacial polymerization to 10 kPa and changing the amount of time that the module was allowed to stand undisturbed after setting the pressure to 10 minutes. The water permeability of this forward osmosis composite hollow fiber membrane module was 9.73 kg/(m$^2$×hr) and the reverse salt flux was 1.13 g/(m$^2$×hr).

The results for average thickness of the separation active layer measured by disassembling this module are shown in Table 1.

Example 4

A forward osmosis composite hollow fiber membrane module was fabricated in the same manner as Example 1 with the exception of setting the core side pressure during interfacial polymerization to 90 kPa and setting the shell side pressure to normal pressure. The water permeability of this forward osmosis composite hollow fiber membrane module was 10.89 kg/(m$^2$×hr) and the reverse salt flux was 1.47 g/(m$^2$×hr).

The results for average thickness of the separation active layer measured by disassembling this module are shown in Table 1.

Example 5

A forward osmosis composite hollow fiber membrane module was fabricated in the same manner as Example 1 with the exception of setting the core side pressure during interfacial polymerization to 190 kPa and setting the shell side pressure to 100 kPa. The water permeability of this forward osmosis composite hollow fiber membrane module was 11.07 kg/(m$^2$×hr) and the reverse salt flux was 1.01 g/(m$^2$×hr).

The results for average thickness of the separation active layer measured by disassembling this module are shown in Table 1.

Comparative Example 1

100 g of m-phenylenediamine and 7.9 g of sodium lauryl sulfate were placed in a 5 L container followed by dissolving by further adding 4,892.1 g of water thereto to prepare 5 kg of a first solution used in interfacial polymerization.

The second solution used in interfacial polymerization was prepared in the same manner as Example 1.

The first solution was filled into the core side (inside of the hollow fibers) of a microporous hollow fiber supporting membrane module, the liquid was extracted after allowing to stand undisturbed for 30 minutes, and the module was put into a state in which the inside of the hollow fibers was wetted by the first solution. A procedure consisting of passing high-pressure air through the core side for 0.5 seconds at a pressure of 500 kPa was repeated 20 times to remove excess first solution.

The second solution was fed to the core side of the aforementioned module for 3 minutes at a flow rate of 1.5 L/min to carry out interfacial polymerization. Both the core side pressure and shell side pressure at this time were at normal pressure and the polymerization temperature was 25° C.

Next, n-hexane was dissipated by allowing nitrogen to flow through the core side of the aforementioned module for 30 minutes at 50° C. and then washing both the shell side and the core side with pure water to fabricate a forward osmosis composite hollow fiber membrane module.

The composite hollow fiber supporting module 11 was removed from the device, n-hexane was dissipated by allowing nitrogen to flow through the core side for 30 minutes at 50° C., and the shell side and core side were washed with pure water to fabricate a forward osmosis composite hollow fiber membrane module.

The water permeability of this forward osmosis composite fiber membrane module was 5.53 kg/(m$^2$×hr) and the reverse salt flux was 30.2 g/(m$^2$×hr).

The results for average thickness of the separation active layer measured by disassembling this module are shown in Table 1.

Figure 4:
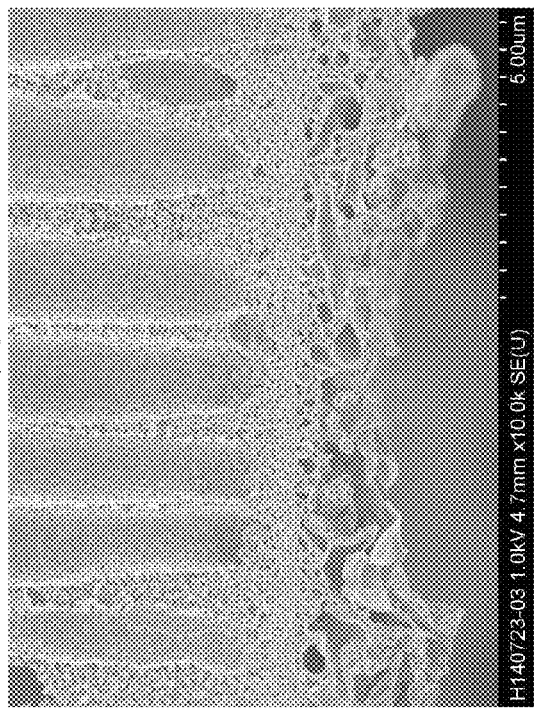
FIG. 4 depicts scanning electron microscope images of cross-sections of hollow fibers of a module of Comparative Example 1. The images consist of cross-sectional images of hollow fibers sampled from an (e) outer peripheral upper portion, (f) outer peripheral lower portion, (g) central upper portion and (h) central lower portion.
Figure 4:
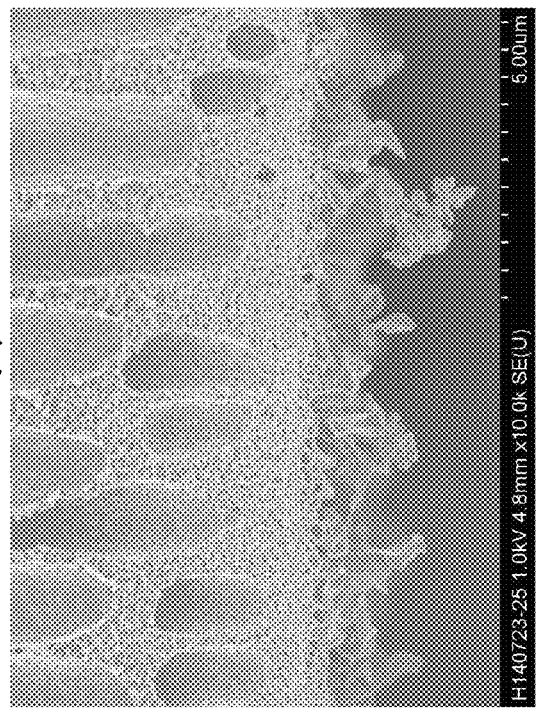
Figure 4:
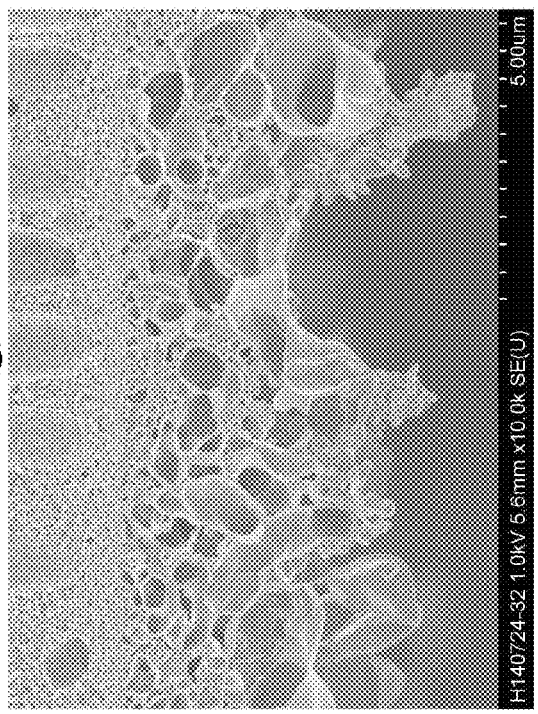
Figure 4:
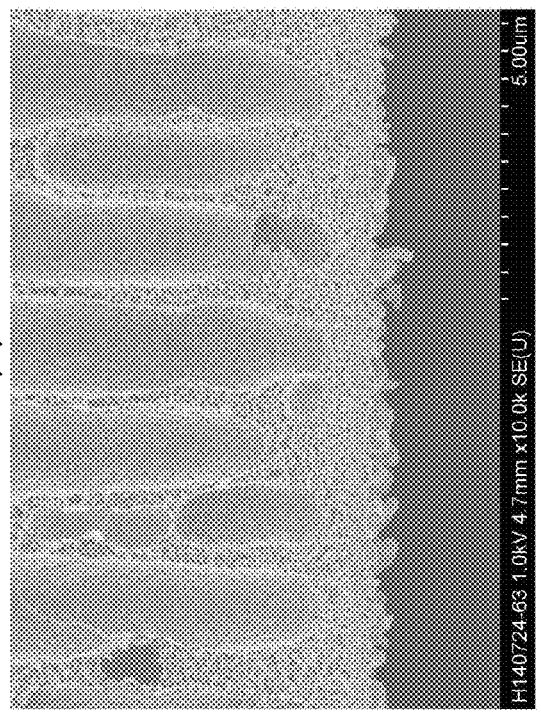
Figure 7:
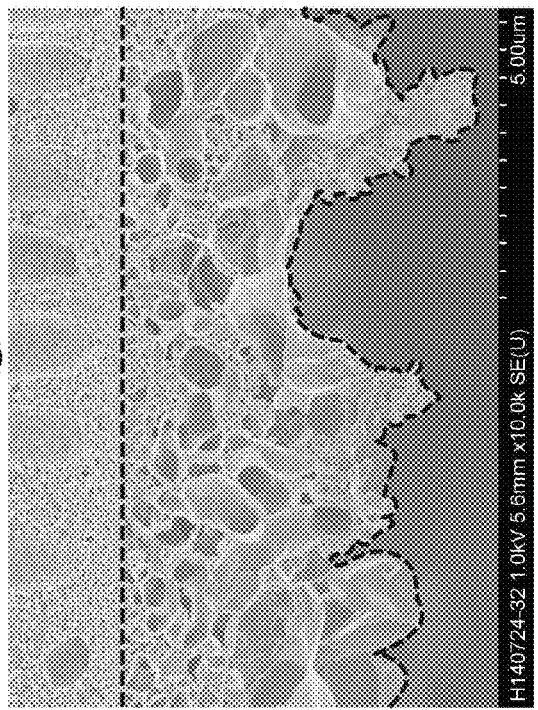
FIG. 7 depicts images obtained by emphasizing portions corresponding to the separation active layer in FIG. 4.
Figure 7:
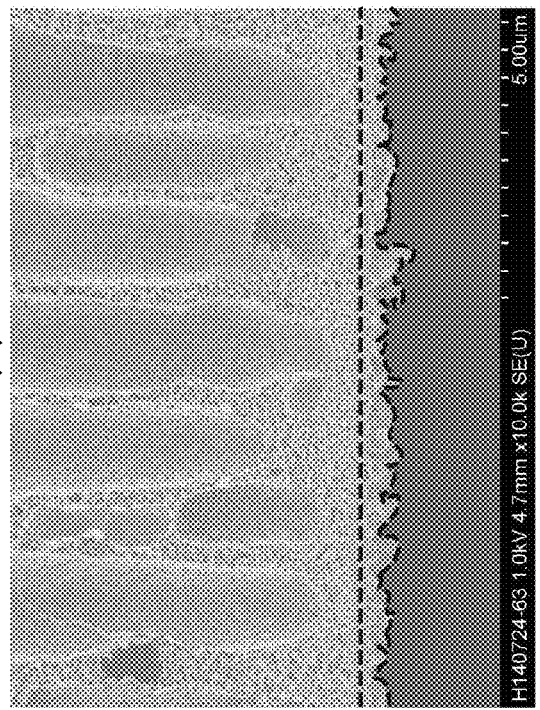
Figure 7:
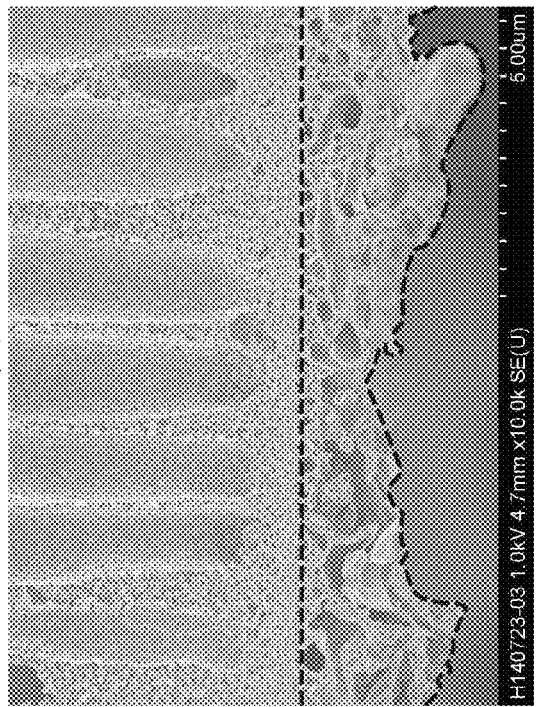
Figure 7:
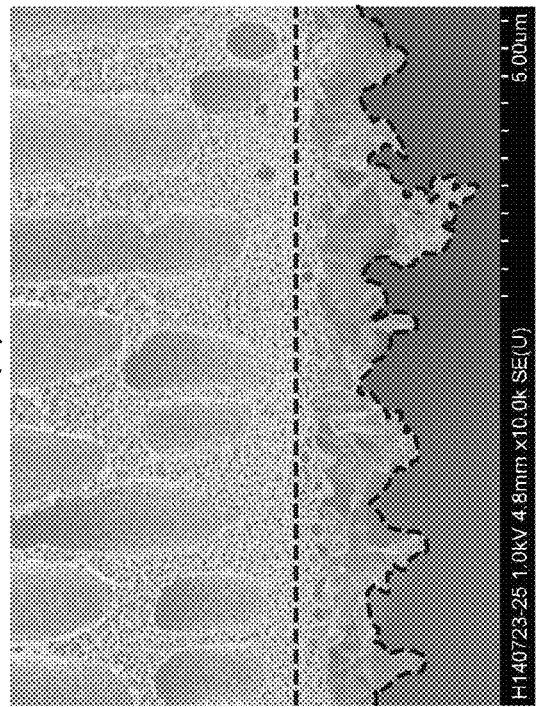

Scanning electron microscope images taken at that time are shown in FIG. 4. FIG. 4(*e*) is a cross-sectional image of a hollow fiber sampled from an outer peripheral upper portion, FIG. 4(*f*) is that sampled from an outer peripheral lower portion, FIG. 4(*g*) is that sampled from a central upper portion, and FIG. 4(*h*) is that sampled from a central lower portion. FIG. 7 depicts images obtained by emphasizing portions corresponding to the separation active layer. Each of the images shown in FIGS. 7(*e*) to 7(*h*) are the respective images obtained by emphasizing portions corresponding to the separation active layer, set off between broken lines, in the images of FIG. 4 having the same reference symbols. Thus, the broken lines in FIGS. 7(*e*) to 7(*h*) respectively serve as cutting lines when measuring the mass of the separation active layer portions in the aforementioned section (3).

The average thickness of each separation active layer was as indicated below:

(e) 2.37 μm, (f) 1.76 μm, (g) 4.65 μm and (h) 0.38 μm.

TABLE 1

| | Average thickness of separation active layer | | | Module | |
|---|---|---|---|---|---|
| | Average value (μm) | Standard deviation σ (LMH) | Coefficient of variation (%) | Water permeability (kg/(m·²hr)) | Reverse salt flux (g/ (m²·hr)) |
| Example 1 | 0.88 | 0.37 | 42.3 | 10.12 | 1.20 |
| Example 2 | 0.91 | 0.41 | 45.1 | 9.81 | 0.99 |
| Example 3 | 0.95 | 0.32 | 34.2 | 9.73 | 1.13 |
| Example 4 | 0.85 | 0.35 | 40.7 | 10.89 | 1.47 |
| Example 5 | 0.81 | 0.32 | 39.5 | 11.07 | 1.01 |
| Comp. Ex. 1 | 2.29 | 1.79 | 77.7 | 5.53 | 30.2 |

As is clear from Table 1, the composite hollow fiber membrane module of the present embodiment favorably demonstrated little variation in average thickness of the separation active layer in comparison with a module of the prior art fabricated using high-pressure air.

Example 6

In this example, variations in performance were investigated for a forward osmosis composite hollow fiber membrane module fabricated in the same manner as Example 1.

The procedure of Example 1 was repeated to fabricate five forward osmosis composite hollow fiber membrane modules using the same fabrication method, including the module of Example 1.

The results of measuring each of these modules for water permeability and the average value thereof, standard deviation, coefficient of variance and reverse salt flux of each module are shown in Table 2.

Comparative Example 2

Variations in performance were investigated in the same manner as Example 6 with the exception of using the method of Comparative Example 1 for the module fabrication method.

The procedure of Comparative Example 1 was repeated to fabricate five forward osmosis composite hollow fiber membrane modules using the same fabrication method, including the module of Comparative Example 1, followed by their respective performance. The results are shown in Table 2.

TABLE 2

| | | Water permeability | | | | |
|---|---|---|---|---|---|---|
| | | Measured value (kg/(m·²hr)) | Average value (kg/(m² × hr)) | Standard deviation σ (LMH) | Coefficient of variation (%) | Reverse salt flux (g/(m²·hr)) |
| Example 1 | | 10.12 | 10.20 | 0.82 | 8 | 1.2 |
| Example 6: Repeat No. | 1 | 9.95 | | | | 1.47 |
| | 2 | 10.05 | | | | 1.05 |
| | 3 | 9.33 | | | | 0.87 |
| | 4 | 11.56 | | | | 0.96 |
| Comp. Ex. 1 | | 5.53 | 6.41 | 1.20 | 18.7 | 30.2 |
| Comp. Ex. 2: Repeat No. | 1 | 7.21 | | | | 25.1 |
| | 2 | 6.17 | | | | 29.3 |
| | 3 | 8.01 | | | | 22.1 |
| | 4 | 5.11 | | | | 23.9 |

As is clear from Table 2, the composite hollow fiber membrane module of the present embodiment demonstrates large water permeability and little variation thereof. It also has low reverse salt flux and is able to stably demonstrate favorable performance.

Comparative Example 3

100 parts by weight of an aromatic polysulfone (trade name: Udel Polysulfone P-1700, Union Carbide Corp.) and 100 parts by weight of Polyvinylpyrrolidone K90 (Wako Pure Chemical Industries, Ltd.) were mixed and dissolved in 500 parts by weight of dimethylformamide (Wako Pure Chemical Industries, Ltd.) followed by adequately degassing to obtain a polymer solution. Next, 3 ml of the resulting polymer solution were dropped onto a glass plate measuring 10 cm×10 cm and having a thickness of 3 mm, and after spreading with a doctor blade having width of 50 mm and gap of 100 μm, the polymer solution was blown with hot air for 2 hours at 80° C. to remove the solvent and obtain a non-porous base material in the form of a flat membrane having a membrane thickness of 30 μm comprising an extremely uniform mixture of 100 parts by weight of aromatic polysulfone and 100 parts by weight of Polyvinylpyrrolidone K90.

On the other hand, cold-curing silicone rubber (trade name: Silpot 184W/C, Dow Corning Corp.) and a curing catalyst in an amount equal to 1/10th the weight thereof were dissolved in n-pentane to prepare a 1% by weight silicone solution.

After supplying the silicone solution obtained in the manner indicated above to the surface of the aforementioned nonporous flat membrane base material for about 3 minutes at the rate of about 30 ml/min, air was blown over the base material for about 1 minute at a linear velocity of 30 m/sec. After then carrying out crosslinking treatment by heating for 1 hr at 100° C., the base material was immersed in 60° C. ethanol for 16 hours to extract and remove the polyvinylpyrrolidone and obtain a composite separation membrane composed by forming a silicone rubber thin film on the surface of a porous flat membrane base material composed of an aromatic polysulfone. This silicone rubber thin film had extremely little thickness unevenness and substantially did not permeate into pores in the surface of the base material.

Figure 8:
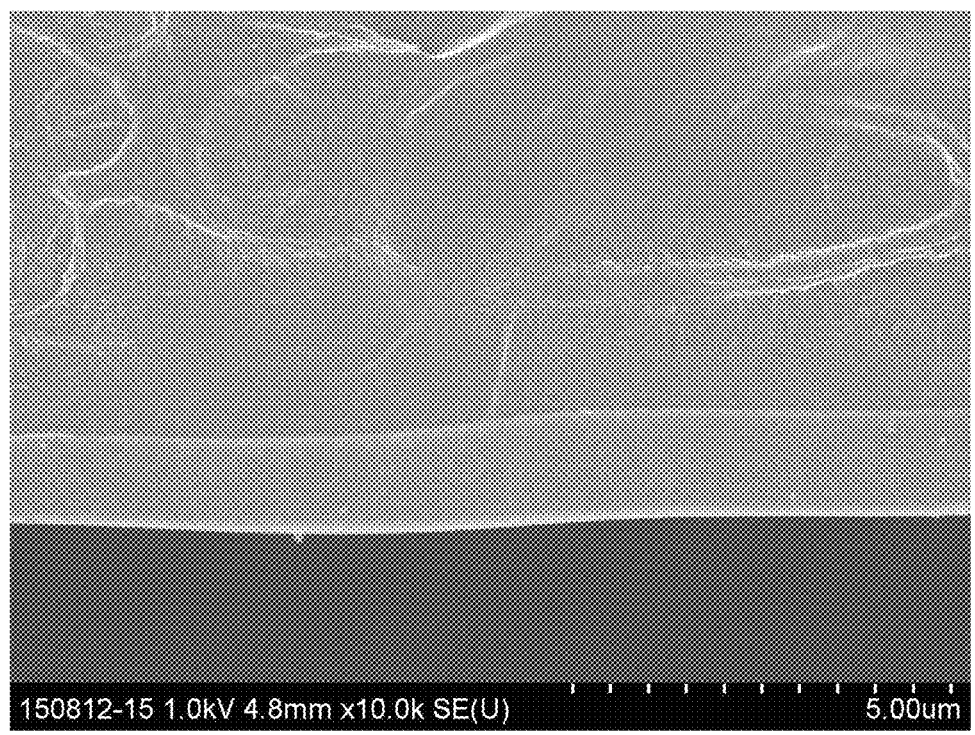
FIG. 8 depicts a scanning electron microscope image of a cross-section of hollow fibers of a module of Comparative Example 3.
Figure 9:
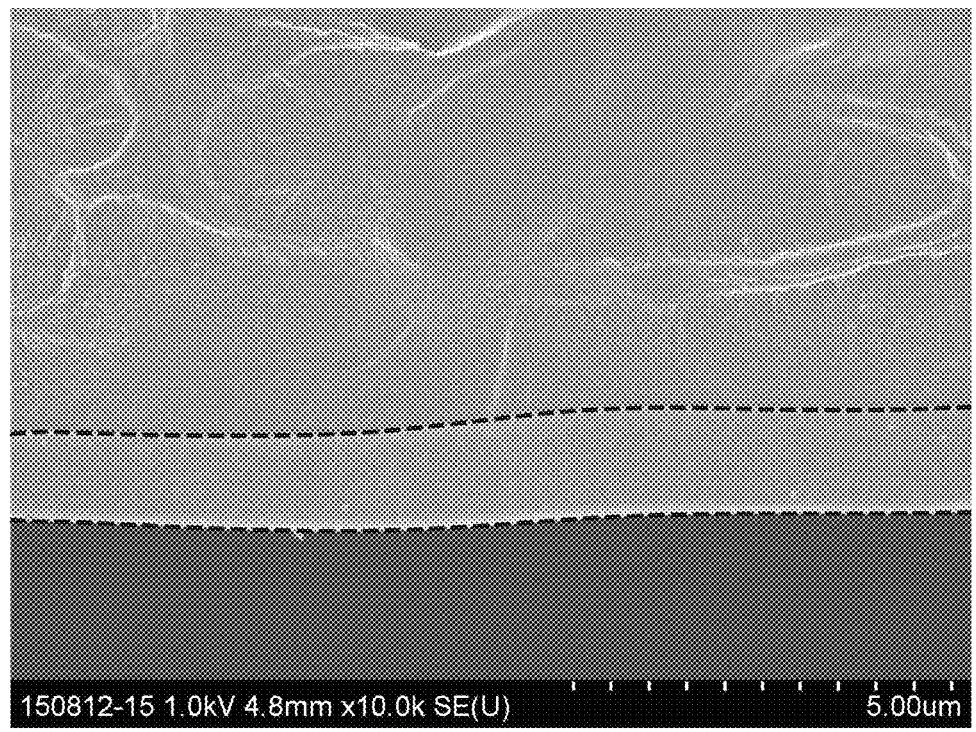
FIG. 9 depicts an image obtained by emphasizing portions corresponding to the separation active layer in FIG. 8.

The ratio L2/L1 of the resulting composite separation membrane as determined according to the method described in the aforementioned section (4) was 1.01. Scanning electron microscope images of the composite separation membrane used to calculate the ratio L2/L1 are shown in FIGS. 8 and 9.

The above results are shown in Table 3 together with the results of ratio L2/L1 obtained in the aforementioned Example 1.

TABLE 3

| | | L2/L1 |
|---|---|---|
| Example 1 | (a) Fiber bundle outer peripheral upper portion | 1.46 |
| | (b) Fiber bundle outer peripheral lower portion | 1.33 |
| | (c) Fiber bundle central upper portion | 1.25 |
| | (d) Fiber bundle central lower portion | 1.24 |
| | Comparative Example 3 | 1.01 |

As is clear from Table 3, in contrast to a separation active layer having a large number of fine surface irregularities being obtained in Example 1 comprising the formation of the separation active layer by interfacial polymerization, in Comparative Example 3, in which the separation active layer is formed by coating a polymer solution, there are few fine irregularities in the surface of the resulting separation active layer.

INDUSTRIAL APPLICABILITY

The composite hollow fiber module of the present invention is preferably used as a forward osmosis membrane in, for example, desalination of seawater, desalting of irrigation water, wastewater treatment, concentration of valuable resources, and advanced treatment of water produced accompanying excavation for oil and gas.

BRIEF DESCRIPTION OF THE REFERENCE SYMBOLS

1 Hollow fiber membrane module
2, 3 Shell side conduits
4 Hollow fibers
5,6 Adhesive immobilized portions
7,8 Headers
9,10 Core side conduits
11 Hollow fiber membrane module
12 Core side pressure regulating device
13 Shell side pressure regulating device
14 Second solution storage tank
15 Second solution feed line
16 Second solution feed pump
17 Second solution drainage tank
18 Second solution drainage line
19 End cap

The invention claimed is:

1. A forward osmosis composite hollow fiber membrane module having hollow fiber bundles composed of a plurality of hollow fibers; wherein,
each fiber of the hollow fiber bundle is a hollow fiber provided with a separation active layer of a polymer thin film on the inner surface of a microporous hollow fiber supporting membrane,
the polymer is at least one type selected from polyamide and polyurea,
the membrane area of the hollow fiber bundles is 1 m$^2$ to 1,000 m$^2$,
the coefficient of variation of average thickness of the separation active layer in the radial direction and lengthwise direction of the hollow fiber bundles, as calculated according to a method consisting of measuring the mass of the separation active layer portion in a scanning electron microscope image of a cross-section of the separation active layer in the direction of thickness, is 0% to 60%,
the thickness at each measured location is represented as the average thickness within a measuring range over a length of 13 μm, and
the ratio L2/L1 between a length L1 of the interface between the separation active layer and the hollow fiber supporting membrane and a length L2 of the supporting active layer surface in the scanning electron microscope image of a cross-section of the separation active layer in the direction of thickness is 1.2 to 5.0.

2. The module according to claim 1, wherein the coefficient of variation is 0% to 50%.

3. The module according to claim 1, wherein the coefficient of variation is 0% to 40%.

4. The module according to claim 1, wherein the coefficient of variation is 0% to 30%.

5. The module according to claim 1, wherein the polyamide is a polycondensation product of a first monomer selected from polyfunctional amines and a second monomer selected from polyfunctional acid halides, and
wherein the polyurea is a polycondensation product of a first monomer selected from polyfunctional amines and a second monomer selected from polyfunctional isocyanates.

6. A method for manufacturing the module according to claim 5, comprising the steps of:
forming a liquid film of a first solution containing either the first monomer or the second monomer on an inner surface of microporous hollow fiber supporting membrane bundles,
providing a pressure difference between inside and outside of the microporous hollow fiber supporting membrane bundles so that pressure on the inside is greater than pressure on the outside (inside pressure>outside pressure), and
going through a step for contacting a second solution containing the other of the first monomer and the second monomer with the liquid film of the first solution so as to carry out interfacial polymerization,
wherein the pressure difference is maintained when carrying out the interfacial polymerization.

7. The method according to claim 6, wherein the pressure difference is generated by reducing pressure on the outside of the hollow fiber supporting membrane bundles.

8. The method according to claim 6, wherein the pressure difference is generated by applying pressure to the inside of the hollow fiber supporting membrane bundles.

9. The method according to claim 6, wherein the pressure difference is generated by applying different pressures to both the outside and inside of the hollow fiber supporting membrane bundles.

10. The method according to claim 6, wherein the pressure difference is 1 kPa to 100 kPa.

* * * * *